S. F. CLOUSER.
Improvement in Railway-Car Brakes.
No. 129,789. Patented July 23, 1872.
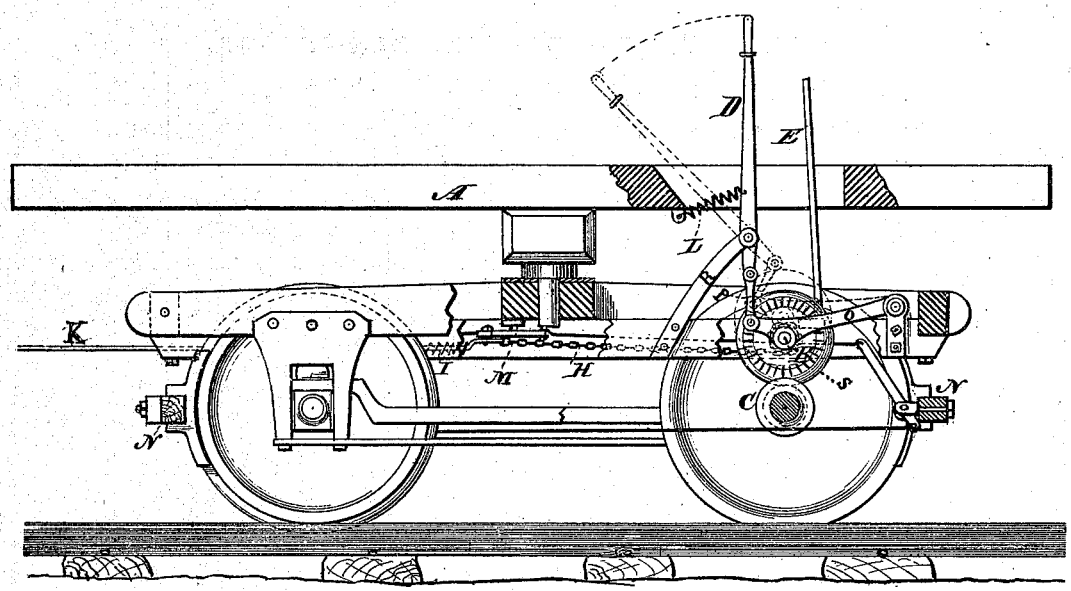
Witnesses.
Inventor.

UNITED STATES PATENT OFFICE.

SAMUEL F. CLOUSER, OF SALT LAKE CITY, UTAH TERRITORY.

IMPROVEMENT IN RAILWAY CAR-BRAKES.

Specification forming part of Letters Patent No. 129,789, dated July 23, 1872.

Specification describing the Application of Friction-Power for the Purpose of Setting Car-Brakes, invented by SAMUEL F. CLOUSER, of Salt Lake City, Utah Territory.

The first part of my invention relates to friction-power used for the purpose of drawing the brakes upon the wheels of the cars; and consists of a horizontal shaft placed above one of the axles of the car or engine, upon which shaft is placed the larger friction-wheel, which being applied by leverage-power to throw the same into gear with a smaller friction-wheel, which is placed on one of the axles of the car or cars or engine, which causes the larger wheel to revolve and take up the chain, which chain is attached to a bar or rod of iron or steel which runs under the entire train and is attached to the brake-levers of the cars. By means of this invention one man—brakeman or the engineer—is enabled to set the brakes instantaneously or gradually on the entire number of cars composing the train.

The drawing represents the side elevation of a car-truck with my improvement applied.

A is the truck of the car. B is the shaft, with the larger friction-wheel upon the same. C is the smaller friction-wheel on the axle of the car. D is the lever for throwing the friction into gear. E is the lever attached to a dog for holding the ratchet and friction-wheel after the power has been applied, thus holding the brake upon the wheels of the cars after the friction-wheels are thrown out of gear when the train is moving forward. P is the knuckle-lever for forcing friction-wheels into gear. This is so arranged that any degree of power required may be obtained either gradually or instantaneously, and may be used by either engineer or brakesman by attaching a wire to the lever. H is chain winding around shaft B attached to bar K, which passes through the train, to which brakes are attached. I is the spring for forcing the brakes on regularly. K is the brake-bar passing through the entire train; L, small spring for pulling lever back and releasing friction. M represents the brake-levers. N is the brake-bars; O, arm attached to frame of car, and made fast by hinge-joint, which raises and lowers large friction-wheel S when lever D is brought into action; P, knuckle-lever power or joint, connecting lever D with arm O, for forcing large friction-wheel S in small wheel C; R, fulcrum-bar, to which lever D is attached; S, large friction-wheel.

I claim as my invention—

The combination of the lever D, knuckle-joint P, arm O, and shaft B with the friction-wheel S, for forcing the wheel S in contact with friction-wheel C.

In testimony whereof I have set my hand this 12th day of July, A. D. 1872.

SAMUEL F. CLOUSER.

Witnesses:
 JAMES S. GRINNELL,
 THOMAS FITCH.